United States Patent [19]

Shimomura

[11] Patent Number: 5,919,008
[45] Date of Patent: Jul. 6, 1999

[54] MILLING CUTTER

[75] Inventor: Masumi Shimomura, Ishikawa-ken, Japan

[73] Assignee: Komatsu Machinery Corp., Komatsu, Japan

[21] Appl. No.: 08/977,241

[22] Filed: Nov. 24, 1997

[30]     Foreign Application Priority Data

Nov. 28, 1996   [JP]   Japan ..................................... 8-317489

[51] Int. Cl.⁶ ....................................................... B23C 5/20
[52] U.S. Cl. ................................ 407/35; 407/43; 407/56; 82/106; 82/107; 82/130
[58] Field of Search .................................. 407/56, 35, 36, 407/39, 40, 43, 44, 47, 51, 53, 55, 58, 61; 82/106, 107, 130, 131

[56]               References Cited

U.S. PATENT DOCUMENTS

| | | | |
|---|---|---|---|
| 3,114,279 | 12/1963 | Froussard | 82/107 |
| 4,097,174 | 6/1978 | Heinlein | 407/56 X |
| 4,276,794 | 7/1981 | Berbalk | 2/130 X |
| 5,725,339 | 3/1998 | Yoshita | 82/106 X |

FOREIGN PATENT DOCUMENTS

| | | | |
|---|---|---|---|
| 0059717 | 4/1983 | Japan | 82/106 |
| 5-253729 | 10/1993 | Japan . | |

*Primary Examiner*—Andrea L. Pitts
*Assistant Examiner*—Henry W. H. Tsai
*Attorney, Agent, or Firm*—Wenderoth, Lind & Ponack, L.L.P.

[57]                ABSTRACT

A milling cutter for performing milling work on a work comprises a cutter body having a ring-shaped structure. A plurality of first tips are disposed on an inner peripheral surface of the cutter body along the circumferential direction thereof with a distance between adjacent ones and adapted to perform rough cutting work on a pin, a journal of the work and journal thrusts disposed at both ends of the journal. A plurality of second tips are disposed on both side portions of the inner peripheral surface of the cutter body along a circumferential direction thereof with a distance between adjacent ones and adapted to perform rough cutting work on side surfaces of counterweights disposed at both end sides of the pin and the journal of the work. A flat drag disposed on an inner peripheral portion of the cutter body and adapted to perform a flat cutting work on the journal thrusts. The flat drag has a cutting edge and is set to the cutter body in a manner that a deviation of the cutting edge of the flat drag in an axial direction of the cutter body is maximized with respect to deviations of the cutting edges of the first tips. According to such structure, since the flat drag performs the surface flat work to improve the surface roughness of the journal thrust, the finish work on the journal thrust can be eliminated, improving productivity.

4 Claims, 7 Drawing Sheets

MILLING CUTTER

BACKGROUND OF THE INVENTION

The present invention relates to a milling cutter for carrying out milling work on work such as a crank shaft.

Generally, work such as crank shaft of an engine is milled by using a cutter for performing the milling working. However, as in FIG. 1, showing a milling state of a work 100, when an outer periphery of a pin 101 of the work 100, journal thrusts 102 positioned at both ends of the pin 101 and side surfaces 104 of counterweights 103 are worked, the following work method has been adopted in the prior art.

That is, as shown in FIG. 2A, when grooving work is carried out on both ends of the pin 101, the outer periphery of the pin 101, the journal thrusts 102 and the side surfaces 104 of the counterweights 103 are first roughly worked at the same time (cutting a margin shown by reference numeral 105), and then grooving work is performed together with finish cutting work on the outer periphery of the pin 101 and the journal thrusts 102 (cutting a margin shown by reference numeral 106). Thereafter, grinding finish work is effected on the outer periphery of the pin 101 (cutting a margin shown by reference numeral 107). In such work, in the technology disclosed in the Japanese Patent Laid-open Publication No. HEI 5-253729, one of tips for carrying out side surface work is used as a flat drag set to a maximally deviated state for improving the surface roughness of the journal thrust 102.

Furthermore, as shown in FIG. 2B, in a case where grooving work is not effected on both the ends of the pin 101, the outer periphery of the pin 101, the journal thrusts 102 and the side surfaces 104 of the counterweights 103 are first roughly worked, and then finish work is effected on the outer periphery of the pin 101 and the journal thrusts 102 through lathe turning or milling work as an independent process. Thereafter, cutting finish work is effected on the outer periphery of the pin 101 or, as shown in FIG. 2C, rough work is effected, and then the cutting finish work is effected simultaneously on the outer periphery of the pin 101 and the journal thrusts 102.

In both the methods mentioned above, the outer periphery of the pin 101 and the journal thrusts 102 are subjected to the finish work after the rough work on the outer periphery of the pin 101, the journal thrusts 102 and the side surfaces 104 of the counterweights 103. In these work methods in which the grinding work is not effected as shown in FIGS. 2B and 2C, substantially the same number of working processes as those in the work method, including the grooving work shown in FIG. 2A, are required, so that all of these working methods require a lot of work time, resulting in less workability and productivity, and thus providing a problem.

SUMMARY OF THE INVENTION

An object of the present invention is to substantially eliminate defects or drawbacks encountered in the prior art described above and to provide a milling cutter capable of eliminating the finish work on the journal thrust by improving the surface roughness of the journal thrust at the time of rough work to thereby reduce the number of work processes and so improve the productivity.

This and other objects can be achieved according to the present invention by providing a milling cutter for performing milling work on to a work comprising a cutter body having a ring-shaped structure. A plurality of first tips are disposed on an inner peripheral surface of the cutter body along a circumferential direction thereof, with a distance between adjacent ones, and adapted to perform rough cutting work on a pin and a journal of the work and journal thrusts disposed at both ends of the journal. A plurality of second tip disposed on both side portions of the inner peripheral surface of the cutter body along a circumferential direction thereof with distance between adjacent ones, and adapted to perform rough cutting work on side surfaces of counterweights disposed at both end sides of the pin and the journal of the work. A flat drag is disposed on an inner peripheral portion of the cutter body and is adapted to perform flat cutting work on the journal thrusts. The flat drag has a cutting edge and is set to the cutter body in a manner that a deviation of the cutting edge of the flat drag in an axial direction of the cutter body is maximized with respect to deviations of cutting edges of the first tips.

In preferred embodiments, at least one of the first tips is formed as the flat drag. The flat drag is disposed on the inner peripheral surface of the cutter body independently from the first tips or disposed on both the side portions of the inner peripheral surface of the cutter body independently from the first tips.

The cutting edge of the flat drag can have a flat surface.

The cutting edge of the flat drag also can have a round shape having a large radius, and the round shape of the cutting edge of the flat drag is satisfied with an equation of $R > f^2 \cdot Z^2 / 8Hth$ in which f is a feed per one flat drag, Z is an effective cutter number, R is a nose radius of the flat drag and Hth is a surface roughness.

According to the characteristic features of the milling cutter mentioned above, the journal thrusts are first subjected to the rough cutting work by the tips for performing the cutting work on the outer periphery of the pin of the work and the journal thrusts and then further worked by the flat drag to flatten the surface on the work. Accordingly, the surface roughness of the journal thrust can be improved and the finish work to the journal thrust, which is required in the prior art technology, can be eliminated, whereby the work steps can be eliminated and the productivity can hence be improved.

The nature and further characteristic features of the present invention can be further made clear from the following description made with reference to the accompanying drawings.

DESCRIPTION OF THE PREFERRED EMBODIMENTS

Figure 1:
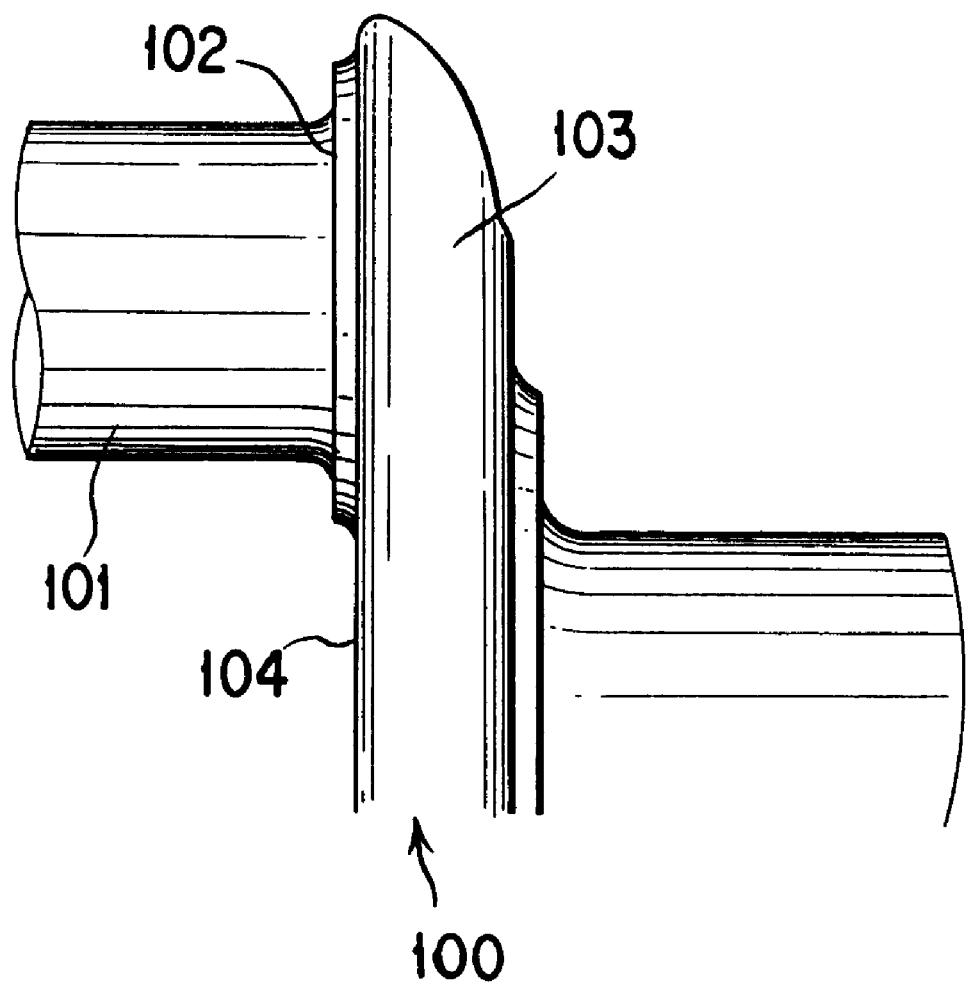
FIG. 1 is a schematic view showing a condition of a work to be worked.
Figure 2A:
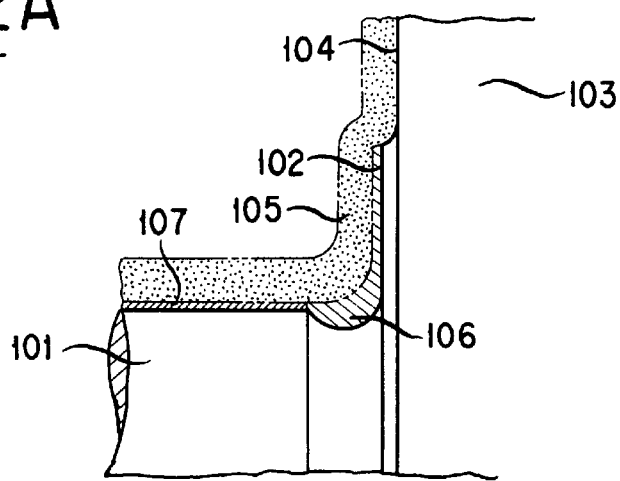
FIGS. 2A, 2B, and 2C are views showing working processes carried out by conventional cutter devices.
Figure 2B:
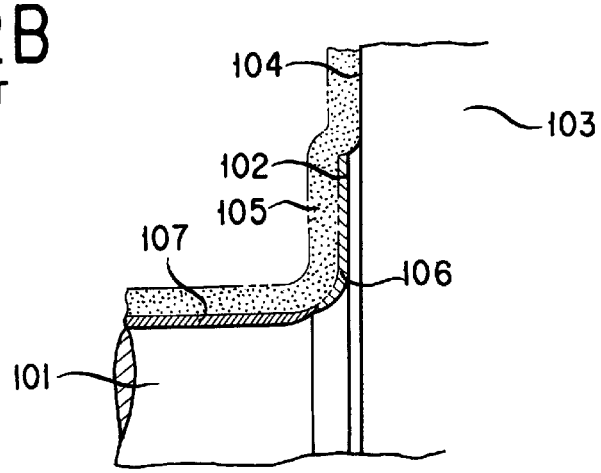
Figure 2C:
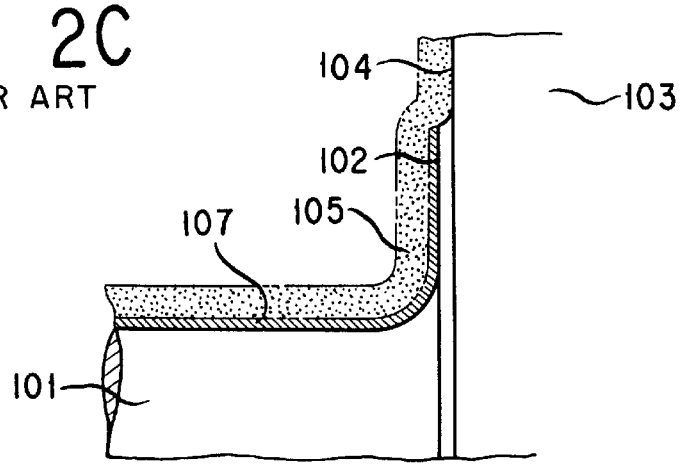
Figure 3:
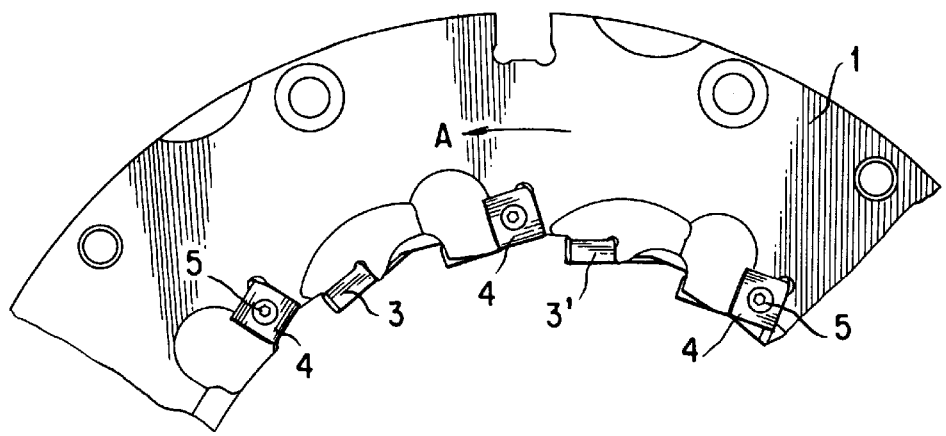
FIG. 3 is a side view of a milling cutter according to first embodiment of the present invention.
Figure 4:
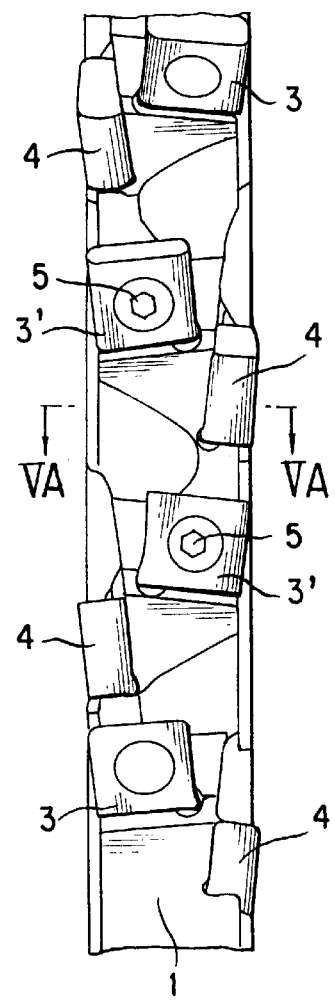
FIG. 4 is a developed view of a tip of the milling cutter of FIG. 3.

The first embodiment of the present invention will be described hereunder with reference to FIGS. 3 to 6.

In these figures, a cutter body having a ring shape is denoted by reference numeral 1. The cutter body 1 is provided with two rows of tips 3 at the inner peripheral surface of the cutter body 1 along a circumferential direction thereof with an equal distance between adjacent ones and also provided with two rows of tips 4 at both side surfaces of the cutter body 1 along the circumferential direction thereof with an equal distance between adjacent ones. The tips 3 are for carrying out rough cutting work to a pin 2a of a work 2 to be worked, an outer periphery of a journal 2b and journal thrusts 2c disposed at both end portions of the pin 2a and the journal 2b, and these tips 4 are for carrying out a rough working to side surfaces 2e of counterweights located at both sides of the pin 2a and the journal 2b.

Each of the working tips 3 has a substantially flat square shape. The tips 3 are secured to the inner peripheral surface of the cutter body 1, by means of fixing members 5 inserted into central portions of the tips 3, in a zigzag or staggered arrangement in the circumferential direction of the inner peripheral surface of the cutter body 1. Each of the tips 3 has four corner portions which serve as cutting edges 3a respectively by changing the arranging direction of the tip 3.

Figure 5A:
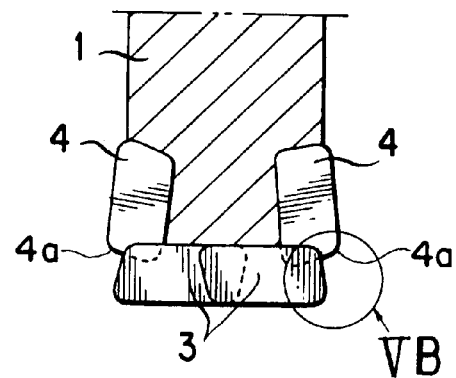
FIG. 5A is a sectional view taken along line VA—VA of FIG. 4
Figure 5B:
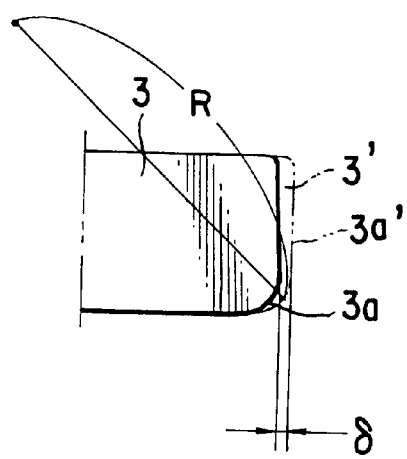
FIG. 5B is an enlarged view of a portion VB encircled in FIG. 5A.

The tips 3 include, for example, one tip in each tip row as a flat drag 3'. A cutting edge 3a' of this flat drag 3', for performing cutting work on the journal thrust 2c, has substantially a flat surface or a round surface (nose) having a large radius R as shown in FIG. 5B. This large radius R is set so as to satisfy the following equation (1), $$R > f^2 \cdot Z^2 / 8Hth \quad (1)$$

in which f represents a feed per one cutting edge of the tip 3, Z represents an effective cutting edge number and Hth represents a surface roughness. The surface roughness Hth, in the case of the nose radius of the flat drag 3' being "r" will, be expressed by the following equation (2).

$$Hth = f^2 / 8r \quad (2)$$

The flat drag 3' is preliminarily set so as to project by an amount δ in a manner such that a deviation of the cutting edge 3a' of the flat drag 3' in the axial direction of the cutter body 1 is maximized with respect to the other side surfaces and the cutting edge 3a of the tip 3, other than the flat drag 3', for work the journal thrust.

Further, each of the other tips 4 for working the side surface 2e of the counterweight 2d also has substantially a flat square shape. The tips 4 are secured to both of the side portions of the inner peripheral surface of the cutter body 1, by means of fixing members 5 inserted into central portions of the tips 4, in a zigzag or staggered arrangement in the circumferential direction of the inner peripheral surface of the cutter body 1. Each of the tips 4 has four corner portions which serve as cutting edges 4a respectively by changing the arranging direction of the tip 4.

The milling cutter of the structure mentioned above will carry out rough work on the work 2 in the following manner.

Figure 6A:
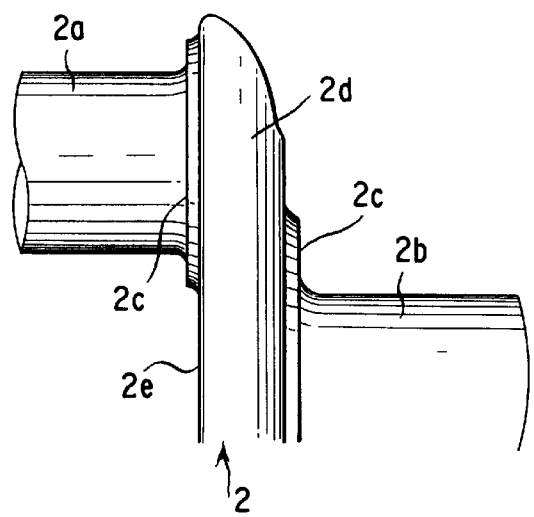
FIGS. 6A, 6B, and 6C are views for explaining functions of the milling cutter of the first embodiment.
Figure 6B:
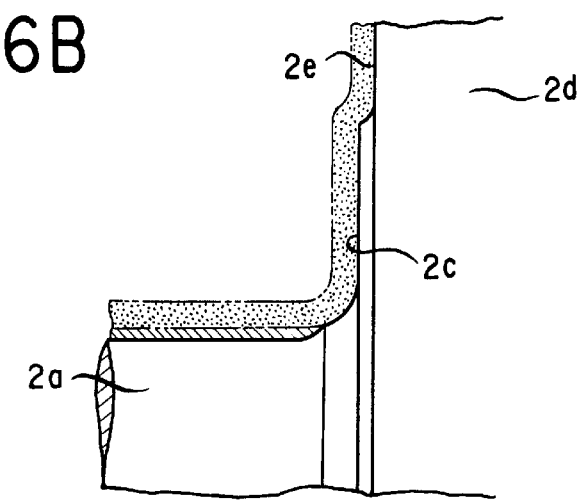
Figure 6C:
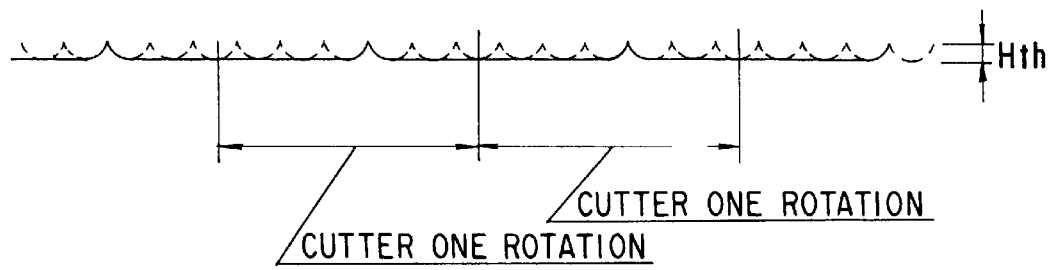

The work 2 is first inserted into the ring shaped cutter body 1 and the work 2 is supported at both ends by a chuck, (not shown). The cutter body 1 is positioned with respect to the pin 2a carrying out the cutting work and then rotated in an arrow direction A in FIG. 3. In this state, the rough work is performed, as shown by stippling in FIG. 6B, to the outer peripheral portion of the pin 2a and the journal thrusts 2c by the tips 3 secured to the inner peripheral surface of the cutter body 1, and at the same time, both the side surfaces 2e of the counterweights 2d are worked by the tips 4 secured to both the side portions of the inner peripheral surface of the cutter body 1. The portion shown with by stippling in FIG. 6B is the work margin.

Under the state mentioned above, since one of the tips 3 in each row thereof arranged in the circumferential direction of the cutter body 1 is formed as the flat drag 3', this tip 3 as the flat drag 3' performs further flat work on the surface of the journal thrust 2c, which has once been subjected to the coarse cutting work by the tips 3 other than the flat drag 3'. Therefore, the surface is made further flat, thus improving the surface roughness, which eliminates the finish cutting work after the coarse cutting work.

That is, since the flat drags 3' of the respective rows of the tips 3 are arranged such that the cutting edges 3a' of the flat drags 3' are deviated maximally with respect to the deviation of the other tips 3 in the axial direction of the cutter body 1, the work surface which has been subjected to the coarse cutting work by the respective tips 3 (the state shown by a broken line in FIG. 6C) is further worked so as to provide a flat surface (the state shown by a solid line in FIG. 6C), whereby the surface roughness can be remarkably improved to provide a smooth surface in comparison with the case of the coarse cutting work on the journal thrust 2c only by means of the tips 3 other than the flat drags 3' this can eliminate the finish work on the journal thrust 2c.

Accordingly, in the next finishing process, it is required to perform the finish work only on the outer periphery of the pin 2a (the portion shown with oblique lines in FIG. 6B), thus eliminating the number of working processes in comparison with the conventional case, in which both the outer periphery of the pin and the journal thrust have been subjected to the finish work, thus improving the productivity.

Although, in the above first embodiment, there is adapted an arrangement in which one of the tips 3 in each of two rows thereof, arranged in the circumferential direction of the inner surface of the cutter body 1 is constructed as the flat drag 3', the present invention is not limited to this first embodiment, and other changes or modifications may be made as described hereunder.

FIGS. 7 and 8 represent a second embodiment of the present invention.

Figure 7A:
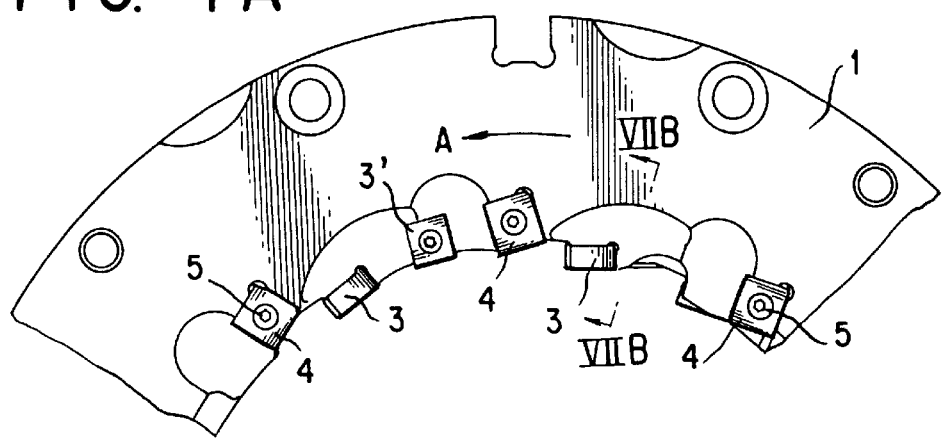
FIG. 7A is a side view of a milling cutter according to a second embodiment of the present invention.
Figure 7B:
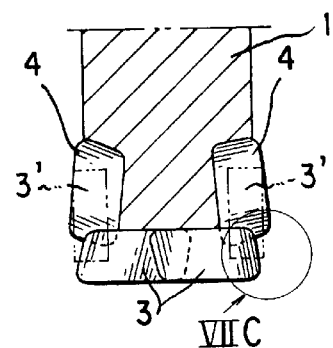
FIG. 7B is a sectional view taken along line VIIB—VIIB of FIG. 7A
Figure 7C:
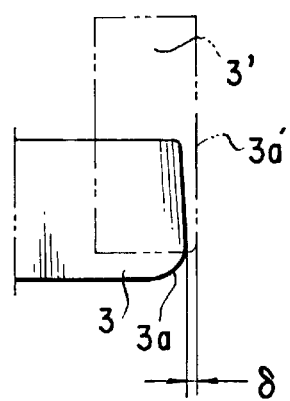
FIG. 7C is an inlaid view of a portion VIIC encircled in FIG. 7B.
Figure 8A:
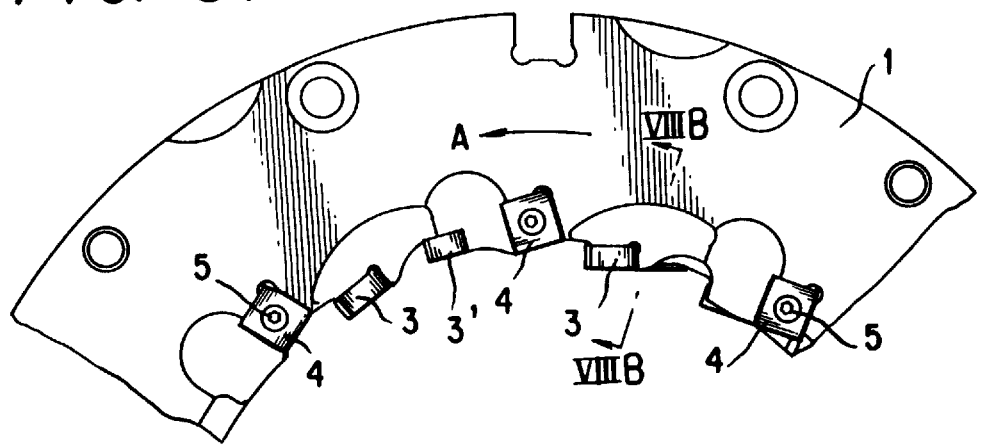
FIG. 8A is a side view of a milling cutter according to a modification of the second embodiment.
Figure 8B:
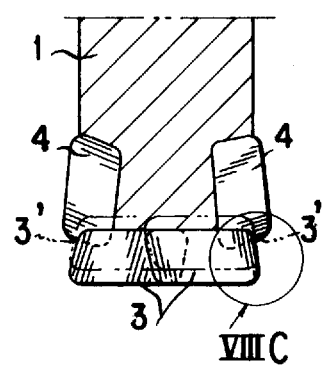
FIG. 8B is a sectional view taken along line VIIIB—VIIIB of FIG. 8A

In the embodiment of FIGS. 7 (7A, 7B) and 8 (8A, 8B), there may be adapted an arrangement in which flat drags 3', different from the tips 3 for performing the cutting work on the outer periphery of the pin and the journal thrust, for performing the cutting working on the journal thrust are independently set to both side portions of the inner peripheral surface of the cutter body 1 (FIGS. 7A, 7B) or set to portions between adjacent tips 3 arranged along the inner peripheral surface of the cutter body 1 (FIGS. 8A, 8B).

Figure 8C:
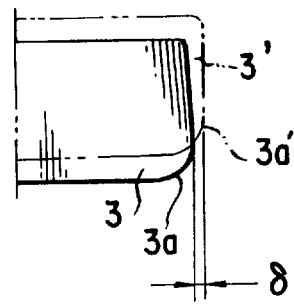
FIG. 8C is an enlarged view showing a portion VIIIC in FIG. 8B.

In such arrangements of the second embodiment, each of the flat drags 3' is arranged such that the cutting edge 3a' of the flat drag 3' is preliminarily set so as to project by an amount of δ so that the deviation of the cutting edge 3a' in the axial direction of the cutter body 1 is maximized with respect to that of the tip 3 as shown in FIG. 7C or 8C.

Furthermore, in the above embodiment, although there is described the coarse cutting work performed on the pin 2a, the journal thrusts 2c and the side surfaces 2e of the counterweights 2d arranged on both ends of the pin 2a, the outer periphery of the journal 2b, the journal thrusts 2c and the side surfaces 2e of the counterweights 2d arranged on both ends of the journal 2b can be subjected to the coarse cutting work in substantially the same manner as that mentioned above.

Although the present invention has been described with reference to the exemplified embodiments, it will be apparent to those skilled in the art that various modifications, changes, omissions, additions and other variations can be made in the disclosed embodiments of the present invention without departing from the scope or spirit of the present invention. Accordingly, it should be understood that the present invention is not limited to the described embodiments, and shall include the scope specified by the elements defined in the appended claims and range of equivalency of the claims.

What is claimed is:

1. A milling cutter, comprising:

a cutter body having a ring-shaped structure, an inner peripheral surface, an axial direction, a circumferential direction, and side portions of said inner peripheral surface;

a plurality of first tips disposed on said inner peripheral surface of said cutter body along the circumferential direction, said plurality of first tips having a distance between adjacent ones thereof and cutting edges, and said plurality of first tips being adapted to perform rough cutting work on a pin and a journal of a work and journal thrusts at ends of the journal;

a plurality of second tips disposed on said side portions of said inner peripheral surface of said cutter body along the circumferential direction and having a distance between adjacent ones thereof, said plurality of second tips being adapted to perform rough cutting work on side surfaces of counterweights disposed at end sides of the pin and the journal of the work; and a flat drag disposed on an inner peripheral portion of said cutter body and adapted to perform flat cutting work on said journal thrust, said flat drag having a cutting edge;

wherein said flat drag has a cutting edge and is positioned with respect to said cutter body such that a deviation of said cutting edge of said flat drag in said axial direction is maximized with respect to deviations of said cutting edges of said plurality of first tips, said cutting edge of said flat drag having a round shape satisfying the equation $R > f^2 \cdot z^2 / 8Hth$, where f is a feed per one flat drag, z is an effective cutting edge number, R is a nose radius of said flat drag and Hth is a surface roughness.

2. The milling cutter of claim 1, wherein at least one of said first tips is formed as said flat drag.

3. The milling cutter of claim 1, wherein said flat drag is disposed on said inner peripheral surface of said cutter body independently from said first tips.

4. The milling cutter of claim 1, wherein said flat drag is disposed on both said side portions of said inner peripheral surface of said cutter body independently from said first tips.

* * * * *